US012607882B1

(12) United States Patent
Valente

(10) Patent No.: US 12,607,882 B1
(45) Date of Patent: Apr. 21, 2026

(54) INTEGRATED ANTENNA FOR EYEWEAR DISPLAY

(71) Applicant: GOOGLE LLC, Mountain View, CA (US)

(72) Inventor: Matthew Thomas Valente, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/984,005

(22) Filed: Dec. 17, 2024

(51) Int. Cl.
| | |
|---|---|
| *G02B 27/01* | (2006.01) |
| *G02C 5/00* | (2006.01) |
| *G02C 11/00* | (2006.01) |
| *H01Q 1/27* | (2006.01) |

(52) U.S. Cl.
CPC .......... *G02C 11/10* (2013.01); *G02B 27/0176* (2013.01); *G02C 5/008* (2013.01); *H01Q 1/273* (2013.01); *G02B 2027/0178* (2013.01)

(58) Field of Classification Search
CPC .... G02C 11/10; G02C 5/008; G02B 27/0176; G02B 2027/0178; H01Q 1/273
See application file for complete search history.

(56) References Cited

U.S. PATENT DOCUMENTS

| | | | |
|---|---|---|---|
| 8,149,177 B1 * | 4/2012 | Callus ................. | H01Q 21/005 |
| | | | 343/705 |
| 12,034,200 B1 * | 7/2024 | Azad ................. | G02B 27/0176 |
| 2022/0102583 A1 * | 3/2022 | Baumheinrich ... | G02B 6/12007 |

* cited by examiner

*Primary Examiner* — Robert J Michaud

(57) ABSTRACT

An eyewear display eyewear display includes a lens configured to direct display light and a support structure having a stiffening structure. The stiffening structure is configured to be an antenna for the eyewear display, such as by providing electromagnetic signals to a radio frequency interface of the eyewear display. By employing the stiffening structures as antennas, the eyewear display makes efficient use of space and materials and maintains a relatively small and lightweight form factor.

11 Claims, 5 Drawing Sheets

INTEGRATED ANTENNA FOR EYEWEAR DISPLAY

BACKGROUND

Eyewear displays, such as smart glasses, are display devices configured in a form factor so that the displays are wearable near the eye. Such eyewear displays are useful in a variety of applications, such as mixed reality, augmented reality, and general computing applications. To support such applications, some eyewear displays include communication circuitry, including one or more antennas, to support communication with other devices, communication with one or more networks, or a combination thereof. However, the integration of the antennas with an eyewear display presents several challenges. For example, the form factor of an eyewear display is such that the antennas can be located relatively close to the user's body, resulting in signal absorption by the body and impacting the effectiveness of the antenna. While this issue can be addressed by increasing antenna power (that is, increasing the power of signals provided to the antenna), such an approach requires a relatively large battery, more powerful signal drivers, and can impact the user's safety.

In addition, eyewear displays that utilize a different display for each eye, known as 'binocular' devices, are typically configured to be stiff enough such that they do not cause deformation, which may cause visual discomfort for a user. Accordingly, metal structures are sometimes embedded in the frame of the eyewear display. However, these metal structures can block the signals from the antennas, and thus negatively impact the performance of the antennas and the user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate embodiments of an eyewear display having one or more stiffening structures that both provide stiffening for the eyewear frame and are configured (e.g., formed of materials, shaped, and connected) to operate as one or more antennas for the display. By employing the stiffening structures as antennas, the eyewear display makes efficient use of space and materials and maintains a relatively small and lightweight form factor. In addition, because the antennas are incorporated into the stiffening structures, the eyewear displays described herein can be manufactured with relatively low-cost and highly reliable manufacturing methods.

In some embodiments, the eyewear display includes a stiffening structure, such as a strip of metal, disposed over a lens of the eyewear display. The stiffening structure thus provides rigidity (that is, reduces the overall amount of flex) for the frame. In addition, the stiffening structure is shaped, based upon specified tuning and performance parameters, to perform as an antenna. In some embodiments, the stiffening structure includes a plurality of segments, with each segment shaped and configured to serve as an antenna for a specified spectrum, radio, and the like, or any combination thereof. Thus, for example, in some embodiments one segment of the stiffening structure is configured to serve as a Bluetooth™ antenna and another segment of the stiffening structure is configured to serve as a WiFi antenna. In some embodiments, each segment is connected to an antenna flex via an attachment member, such as a nut and screw. In some embodiments, each antenna flex includes or is attached to a corresponding antenna tuner (e.g., an antenna tuner integrated circuit).

Figure 1:
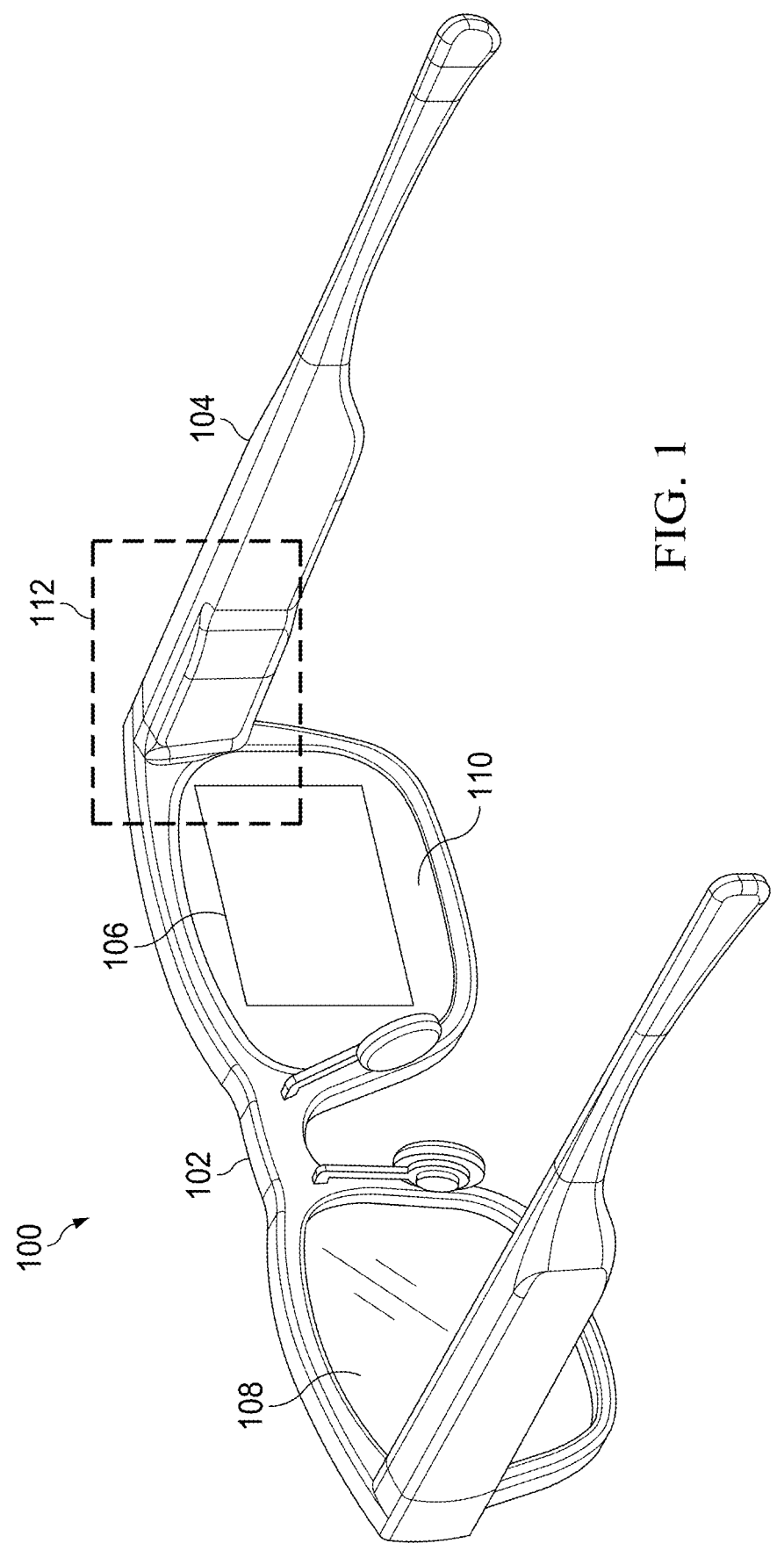
FIG. 1 is a diagram of an eyewear display including one or more antennas that form a stiffening structure for the display in accordance with some embodiments.

FIG. 1 illustrates an example eyewear display 100 in accordance with various embodiments. The eyewear display 100 (also referred to as a wearable heads up display (WHUD), head-mounted display (HMD), near-eye display, or the like) has a support structure 102 (sometimes referred to as a frame) that includes an arm 104, which houses a micro-display projection system configured to project images towards the eye of a user, such that the user perceives the projected images as being displayed in a field of view (FOV) area 106 of a display at one or both of lens elements 108, 110. In the depicted embodiment, the support structure 102 of the eyewear display 100 is configured to be worn on the head of a user and has a general shape and appearance (i.e., "form factor") of an eyeglasses frame. The support structure 102 contains or otherwise includes various components to facilitate the projection of such images towards the eye of the user, such as an image source, a light engine assembly (LEA), and a waveguide (shown in FIG. 2, for example). In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 includes one or more batteries or other portable power sources for supplying power to the electrical components of the eyewear display 100. In some embodiments, some or all of these components of the eyewear display 100 are fully or partially contained within an inner volume of support structure 102, such as within the arm 104 in region 112 of the support structure 102. It should be noted that while an example form factor is depicted, it will be appreciated that in other embodiments the eyewear display 100 may have a different shape and appearance from the eyeglasses frame depicted in FIG. 1.

In some embodiments, one or both of the lens elements 108, 110 are used by the eyewear display 100 to provide a mixed reality (MR) or an augmented reality (AR) display in which rendered graphical content can be superimposed over or otherwise provided in conjunction with a real-world view as perceived by the user through the lens elements 108, 110. In some embodiments, one or both of lens elements 108, 110 serve as optical combiners that combine environmental light (also referred to as ambient light) from outside of the eyewear display 100 and light emitted from an image source in the eyewear display 100. For example, light used to form a perceptible image or series of images may be projected by the image source of the eyewear display 100 onto the eye of the user via a series of optical elements, such as a waveguide formed at least partially in the corresponding lens element, a LEA including one or more light filters, lenses, scan mirrors, optical relays, prisms, or the like, and a patterned layer formed on the front surface of the image source. In some embodiments, the image source is configured to emit light having a plurality of wavelength ranges, e.g., red light, green light, and blue light (collectively referred to as RGB light). The light passes through the patterned layer to the LEA, which propagates the light towards an incoupler of the waveguide. The incoupler of the waveguide receives this light and incouples it into the waveguide. One or both of the lens elements 108, 110 thus includes at least a portion of a waveguide that routes display light received by the incoupler of the waveguide to an outcoupler of the waveguide, which outputs the display light towards an eye of a user of the eyewear display 100. The display light is modulated and projected onto the eye of the user such that the user perceives the display light as an image in FOV area 106. In addition, in some embodiments, each of the lens elements 108, 110 is sufficiently transparent to allow a user to see through the lens elements to provide a field of view of the user's real-world environment such that the image appears superimposed over at least a portion of the real-world environment.

In some embodiments, the image source is a modulative light source such as a display panel having one or more light-emitting diodes (LEDs) or organic light-emitting diodes (OLEDs) (e.g., a micro-LED display panel or the like) located in region 112. In some embodiments, the image source is configured to emit RGB light. The image source is communicatively coupled to the controller (not shown) and a non-transitory processor-readable storage medium or memory storing processor-executable instructions and other data that, when executed by the controller, cause the controller to control the operation of the image source. In some embodiments, the controller controls a display area size and display area location for the image source and is communicatively coupled to the image source that generates virtual content to be displayed at the eyewear display 100. In some embodiments, the image source emits light over a variable area, designated the FOV area 106, of the eyewear display 100. The variable area corresponds to the size of the FOV area 106, and the variable area location corresponds to a region of one of the lens elements 108, 110 at which the FOV area 106 is visible to the user. Generally, it is desirable for a display to have a wide FOV area 106 to accommodate the outcoupling of light across a wide range of angles.

As previously mentioned, a waveguide is integrated into one or both of lens elements 108, 110. In some configurations, the waveguide includes a single waveguide substrate and in other configurations, the waveguide includes multiple waveguide substrates stacked on top of one another (referred to as a waveguide stack). The waveguide is separated from the image source by a first distance that is restricted by the form factor of the eyewear display 100 and, according to some aspects of the present disclosure, a LEA is positioned within this first distance. In addition, a patterned layer is applied to the surface of the image source between the image source and the LEA. In some embodiments, the incoupler of the waveguide includes features to increase the incoupling of light into the waveguide for eventually outcoupling to the user via FOV area 106.

In some embodiments, and as described further herein, the support structure 102 includes one or more stiffening structures that enhance the rigidity of the support structure 102. Thus, for example, in some embodiments the support structure 102 includes one or more metal members, such as metal wire, tubes, threads, strips, and the like embedded within plastic or other materials of the support structure 102. These metal members are arranged to enhance the stiffness (that is, reduce the flex) of the support structure 102. Thus, in different embodiments the stiffening structures are arranged over a top of one or more of the lens elements 108 and 110, along a side of one or more of the lens elements 108 and 110, along a bottom portion of one or more of the lens elements 108 and 110, and the like, or any combination thereof.

In some embodiments, one or more of the stiffening structures is configured to act as an antenna. Thus, for example, in some embodiments, one or more of the stiffening structures is connected to a radio frequency (RF) interface, such as a Bluetooth™ interface, a WiFi interface. The stiffening structure receives (e.g., over the air, from the RF interface, or both) electromagnetic signals, and provides those electromagnetic signals to the RF interface, transmits those electromagnetic signals over the air, and the like, or any combination thereof. Furthermore, in some embodiments, one or more of the stiffening structures includes a plurality of segments, and each segment is configured to act as an antenna for a different spectrum of electromagnetic signals. In some embodiments, each segment is connected to a different RF interface of the eyewear display 100.

Figure 2:
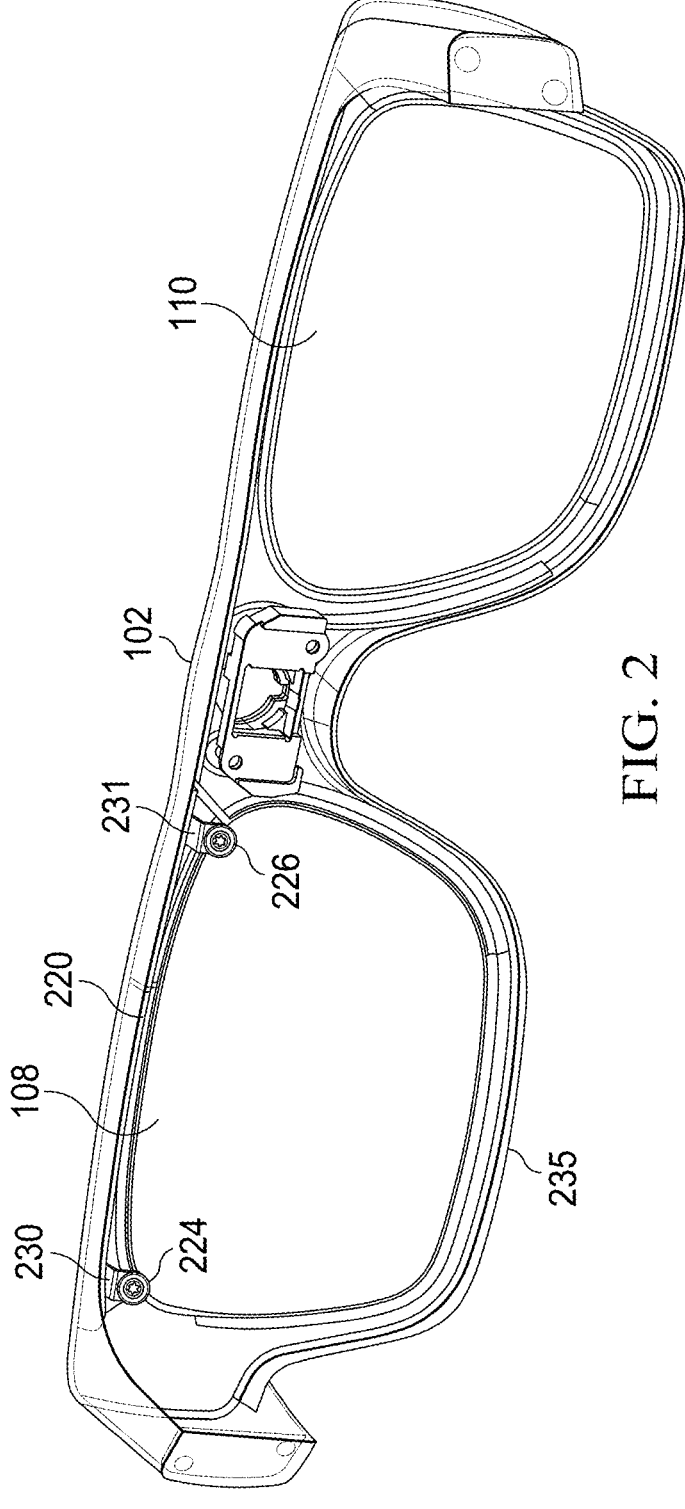
FIG. 2 is a diagram illustrating an alternate view of the eyewear display of FIG. 1 in accordance with some embodiments.

FIG. 2 illustrates an alternate view of the eyewear display 100 in accordance with some embodiments. In the depicted example, the support structure 102 includes a stiffening structure 220 disposed over the lens element 108. Thus, when the support structure 102 is in a wearable orientation, such that the arms of the support structure 102 are arranged to be placed over the ears of a user, the stiffening structure 220 is arranged between the lens element 108 and a top of the support structure 102. In the illustrated embodiment, the support structure 102 is composed of a plastic material 235 that is a generally flexible material, relative to the stiffening structure 220. The stiffening structure 220 is composed of a metal material that is less flexible (that is, has a higher stiffness) than the plastic material 235. During a manufacturing process, the stiffening structure 220 is embedded within the plastic material 235. For example, in some embodiments the plastic material 235 is formed to have the general eyeglass shape of the support structure 102 and is formed to have a recess over the lens element 108. During the manufacturing process, the stiffening structure 220 is inserted into the recess. This increases the overall rigidity of the support structure 102. Thus, in some embodiments, the support structure 102 has a greater force per unit length than the plastic material 235 (because the stiffening structure 220 enhances the stiffness of the support structure 102).

The stiffening structure 220 is configured to act as an antenna for the eyewear display 100. Thus, in some embodiments, the stiffening structure 220 is composed of a material that efficiently receives, transmits, or both, electromagnetic signals of a specified frequency range. The stiffening structure 220 is connected to an RF interface (not shown at FIG.

2) and provides received electromagnetic signals to the RF interface, receives electromagnetic signals from the RF interface, or any combination thereof. For example, in the depicted embodiment, the stiffening structure 220 is connected to flex members 230 and 231. The flex members 230 and 231 are flexible connectors, such as flex cabling, configured to carry electromagnetic signals between the stiffening structure 220 and an RF interface. In some embodiments, one or more of the flex members 230 and 231 includes an antenna tuning module (e.g., an integrated circuit) configured to tune the antenna operations of the stiffening structure 220. The flex members 230 and 231 are attached to the support structure 102 via attachment members 224 and 226 respectively. The attachment members 224 and 226 are screws, nuts, and the like, or any combination thereof, or any other component configured to attach a flex or other cable to a frame. In some embodiments, instead of the flex members 230 and 231, the stiffening structure 220 is connected to the RF interface with a microcoaxial connector, or via a direct solder connection.

Figure 3:
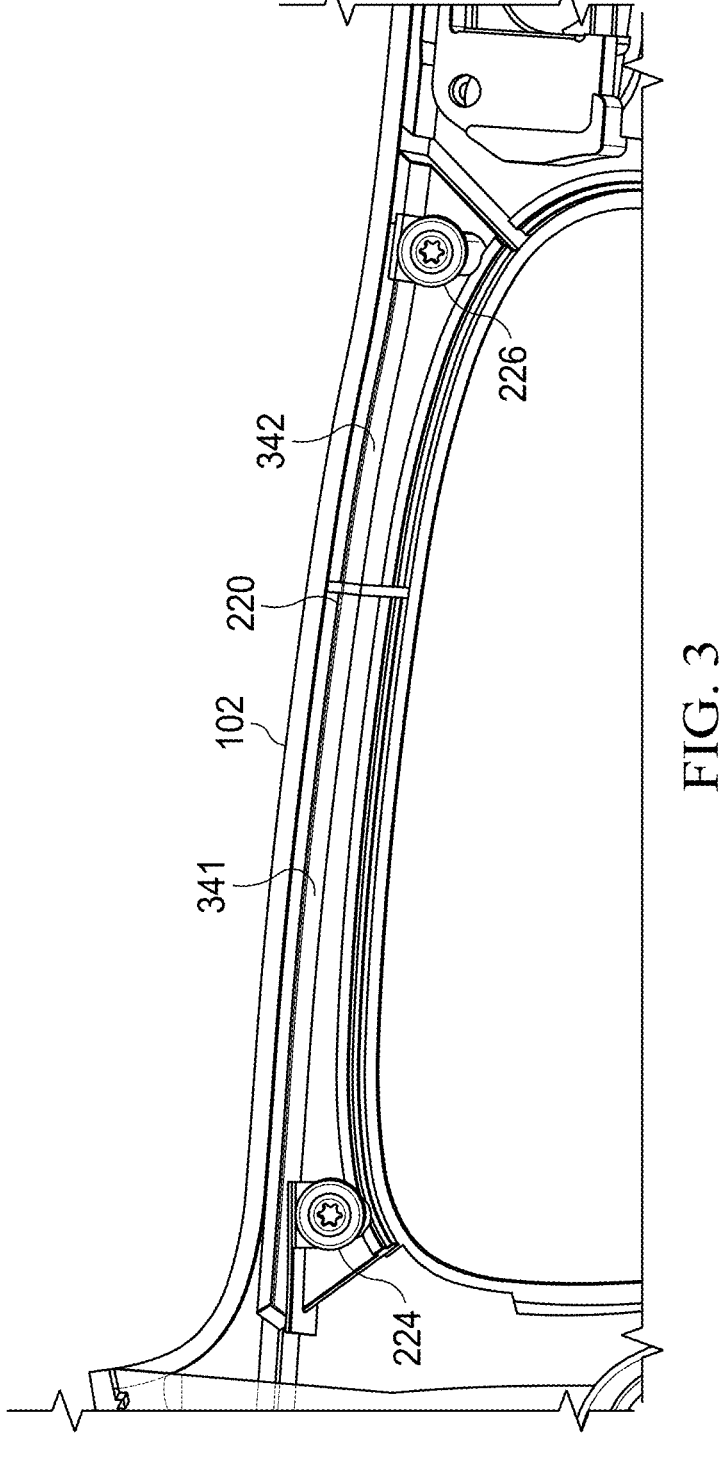
FIG. 3 is a diagram illustrating a closer view of the antenna of the eyewear display of FIG. 1 in accordance with some embodiments.

FIG. 3 illustrates another embodiment of the support structure 102 in accordance with some embodiments. In the example of FIG. 3, the stiffening structure 220 includes two segments, designated segments 341 and 342. In some embodiments, the segments 341 and 342 are electrically isolated from each other, and each of the segments 341 and 342 is formed of a specified material, is of a specified shape and length, is arranged in a specified orientation, and the like, or any combination thereof, so that each of the segments 341 and 342 acts as an antenna for a different frequency spectrum (that is, a different spectrum of electromagnetic signals). Thus, in some embodiments the segment 341 is configured to act as an antenna for Bluetooth™ signals (between 2400 to 2483.5 Megahertz) and the segment 341 is configured to act as an antenna for WiFi signals (e.g., between 5.725-5.875 Gigahertz). In some embodiments, each of the segments 341 and 342 is connected, via the flex 230 and the flex 231, respectively, to a different RF interface of the eyewear display 100.

Figure 4:
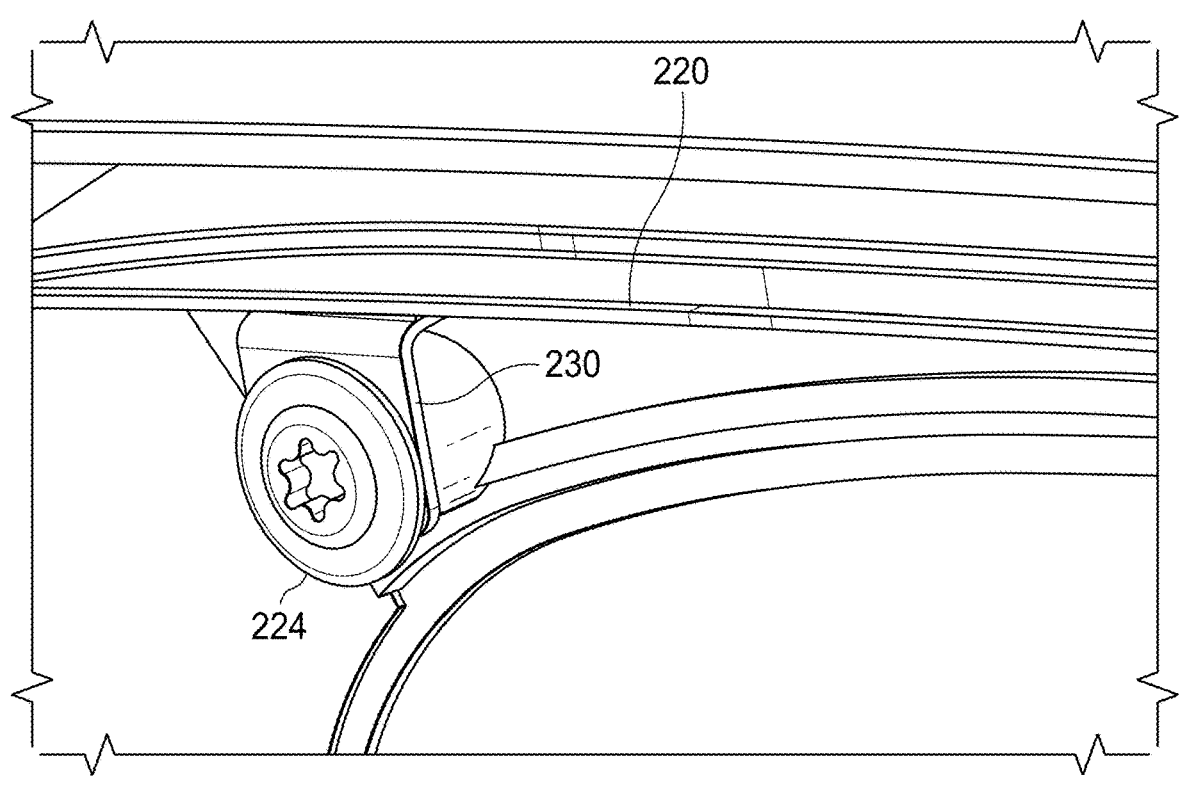
FIG. 4 is a diagram illustrating a closer view of an attachment member and flex member connecting to the antennas of the eyewear display of FIG. 1 in accordance with some embodiments.
Figure 5:
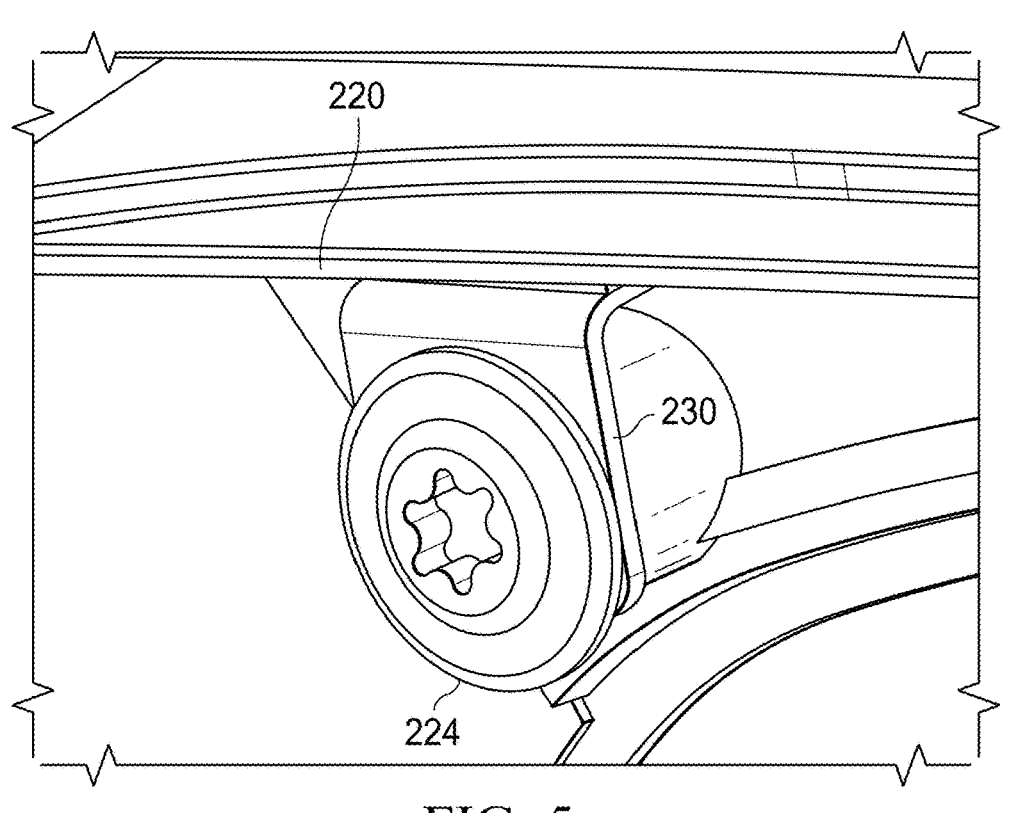
FIG. 5 is a diagram illustrating a closer view of the attachment member and flex member of FIG. 4 in accordance with some embodiments.

FIGS. 4 and 5 illustrate closer views of the stiffening structure 220, the flex 230 and the attachment member 224. It will be appreciated that, while FIGS. 2-5 illustrate stiffening structure 220 disposed over the lens element 108, in other embodiments the stiffening structure 220 is disposed below the lens element 108. In still other embodiments the stiffening structure 220 is disposed along a side of the lens element 108. In other embodiments, the stiffening structure is disposed in one or more of the above arrangements (above, below, or along a side) with respect to the lens element 110. Moreover, in some embodiments, the eyewear display 100 includes any combination of these arrangements.

Figure 6:
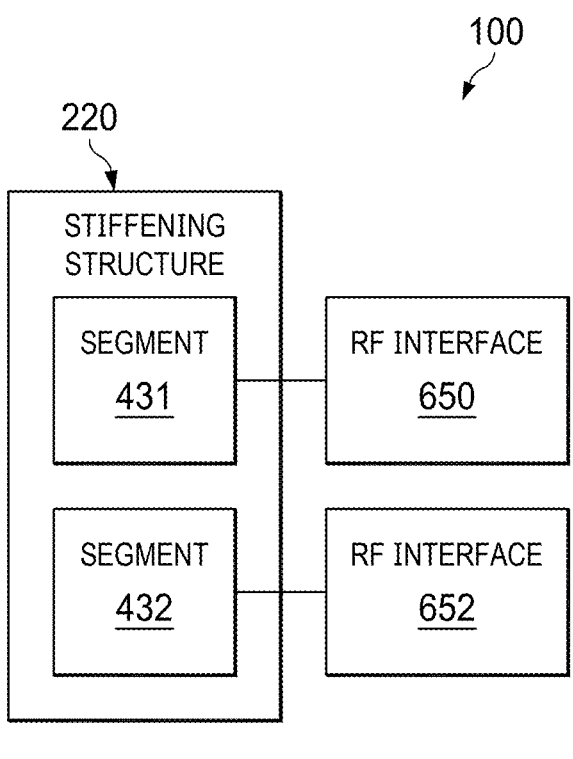
FIG. 6 is a block diagram of the eyewear display of FIG. 1, illustrating connection of the stiffening structure to radio frequency interfaces of the display in accordance with some embodiments.

FIG. 6 illustrates a block diagram of aspects of the eyewear display 100 in accordance with some embodiments. In the illustrated example, the eyewear display 100 includes RF interfaces 650 and 652. Each of the RF interfaces 650 and 652 is circuitry configured to provide a wireless signal interface for the eyewear display 100, thus supporting wireless communication between the eyewear display and one or more other devices (not shown), such as a computer device, smartphone, wearable device (e.g., a smartwatch), and the like, or any combination thereof. The RF interfaces 650 and 652 each provide an RF interface according to a different RF communication protocol. Thus, for example, in some embodiments the RF interface 650 is a Bluetooth™ interface and the RF interface 652 is a WiFi interface.

Each of the RF interfaces 650 and 652 is connected to a different segment of the stiffening structure 220. Thus, in the depicted embodiment, the RF interface 650 is connected to segment 431 and the RF interface 652 is connected to segment 432. Each of the segments 431 and 432 is configured to act as an antenna for the electromagnetic spectrum corresponding to the RF interfaces 650 and 652, respectively. Thus, the stiffening structure 220 both stiffens the support structure 102 and includes segments that act as antennas for different RF interfaces.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An eyewear display comprising:

a support structure including a stiffening structure, the stiffening structure configured to be an antenna for the eyewear display; and a lens including a waveguide configured to direct display light.

2. The eyewear display of claim 1, wherein the stiffening structure is disposed over the lens.

3. The eyewear display of claim 1 further comprising:

a first radio frequency (RF) interface coupled to the stiffening structure.

4. The eyewear display of claim 3, wherein:

the stiffening structure includes a plurality of segments, each of the plurality of segments configured to be an antenna for a different spectrum of electromagnetic signals.

5. The eyewear display of claim 4, further comprising:

a second RF interface; and wherein:

the plurality of segments includes a first segment and a second segment; and the first segment is coupled to the first RF interface and the second segment is coupled to the second RF interface.

6. The eyewear display of claim 5, wherein:

the first RF interface is a Bluetooth™ interface and the second RF interface is a WiFi interface.

7. The eyewear display of claim 3, further comprising:

a flex member configured to couple the antenna to the first RF interface.

8. The eyewear display of claim 7, wherein the flex member includes an antenna tuner.

9. The eyewear display of claim 7, further comprising:

an attachment member that connects the flex member to the support structure.

10. The eyewear display of claim 7, further comprising a microcoaxial connector configured to couple the antenna to the first RF interface.

11. The eyewear display of claim 7, further comprising a solder connection configured to couple the antenna to the first RF interface.

* * * * *